United States Patent
Lorton et al.

(10) Patent No.: US 12,282,813 B1
(45) Date of Patent: Apr. 22, 2025

(54) SYSTEM AND METHOD FOR DYNAMIC REGISTRATION AND UTILIZATION OF QR-CODE IDENTIFIERS ON PHYSICAL MEDIA

(71) Applicants: Michael Samuel Lorton, San Francisco, CA (US); Anees Iqbal, El Granada, CA (US)

(72) Inventors: Michael Samuel Lorton, San Francisco, CA (US); Anees Iqbal, El Granada, CA (US)

(73) Assignee: QRable, LLC, El Granada, CA (US)

( * ) Notice: Subject to any disclaimer, the term of this patent is extended or adjusted under 35 U.S.C. 154(b) by 0 days.

(21) Appl. No.: 18/963,679

(22) Filed: Nov. 28, 2024

(51) Int. Cl.
  *G06K 19/06* (2006.01)
  *H04L 9/32* (2006.01)

(52) U.S. Cl.
  CPC ...... *G06K 19/06037* (2013.01); *H04L 9/3247* (2013.01)

(58) Field of Classification Search
  CPC .. G06K 19/06037; G06K 19/00; G06K 19/06; G06K 19/06103; G06K 7/1417
  USPC .......... 235/494, 462.1, 462.09, 470
  See application file for complete search history.

(56) References Cited

U.S. PATENT DOCUMENTS

| | | | | |
|---|---|---|---|---|
| 2013/0238979 A1 * | 9/2013 | Sayers, III | ............ | G06F 40/166 715/234 |
| 2015/0282216 A1 * | 10/2015 | Reshef | ................. | H04L 63/104 455/39 |
| 2021/0406868 A1 * | 12/2021 | Brightman | ....... | G06K 19/06037 |
| 2022/0366061 A1 * | 11/2022 | Spivack | ................ | H04L 9/3271 |

FOREIGN PATENT DOCUMENTS

| | | | | |
|---|---|---|---|---|
| CN | 105917328 A | * | 8/2016 | ......... G06F 16/9554 |
| WO | WO-2021159096 A1 | * | 8/2021 | ......... G06K 19/0614 |

* cited by examiner

*Primary Examiner* — Edwyn Labaze
(74) *Attorney, Agent, or Firm* — Adam Warwick Bell

(57) ABSTRACT

This invention provides a novel system and method for dynamic QR-code registration and utilization, enabling users to define specific purposes for QR-codes printed on various physical media and attached to a person, animal or thing.

20 Claims, 2 Drawing Sheets

Diagram illustrating the structure of the QR-code, including the CATEGORY, random identifier, and cryptographic signature

SYSTEM AND METHOD FOR DYNAMIC REGISTRATION AND UTILIZATION OF QR-CODE IDENTIFIERS ON PHYSICAL MEDIA

STATEMENT OF GOVERNMENT SUPPORT

This invention was made with support of the following government agencies: None

RELATIONSHIP TO OTHER APPLICATIONS

None.

FIELD OF THE INVENTION

The present invention relates to a system and method for the dynamic registration and utilization of QR-codes, particularly those used on physical media for various user-defined purposes, including communication, redirection, and information sharing.

BACKGROUND

A QR code (quick-response code) is a type of two-dimensional matrix barcode, invented in 1994, by Japanese company Denso Wave for labeling automobile parts. It features black squares on a white background with fiducial markers, readable by imaging devices like cameras, and processed using Reed-Solomon error correction until the image can be appropriately interpreted. The required data is then extracted from patterns that are present in both the horizontal and the vertical components of the QR image.

Whereas a barcode is a machine-readable optical image that contains information specific to the labeled item, the QR code contains the data for a locator, an identifier, and web-tracking. To store data efficiently, QR codes use four standardized modes of encoding: (i) numeric, (ii) alphanumeric, (iii) byte or binary, and (iv) kanji. Compared to standard UPC barcodes, the QR labeling system was applied beyond the automobile industry because of faster reading of the optical image and greater data-storage capacity in applications such as product tracking, item identification, time tracking, document management, and general marketing.

QR-codes have become a popular medium for conveying information through mobile devices, and virtually every modern mobile device has a camera with software capable of recognizing and interpreting QR-codes.

However, traditional QR-codes are static and serve a single, predefined purpose.

There is a need for a QR code system that provides easy-to-use dynamic registration and reregistration and utilization of QR-codes, enabling users to assign specific functionalities to QR-codes after the first scan.

BRIEF DESCRIPTION OF THE INVENTION

This invention provides a system facilitating dynamic registration and utilization of QR-codes, enabling users to assign specific functionalities to QR-codes after the first scan. The invention further encompasses a wide range of applications, including secure messaging for vehicle owners, property alert systems, valuable item tracking, URL redirection, social interaction, and emergency medical information sharing. In a typical commercial embodiment directed at reporting information associated with parked vehicles, the invention provides a service using a programmable quick response (QR) code affixed to or physically associated with a person, object or thing, for example a vehicle, a home, a chattel, an animal, a piece of land or a person, by which a user may scan the QR code with a smart-phone or similar device to report real-time data associated with person, object or thing to the registered owner of the QR code.

DETAILED DESCRIPTION OF THE INVENTION

Figure 1:
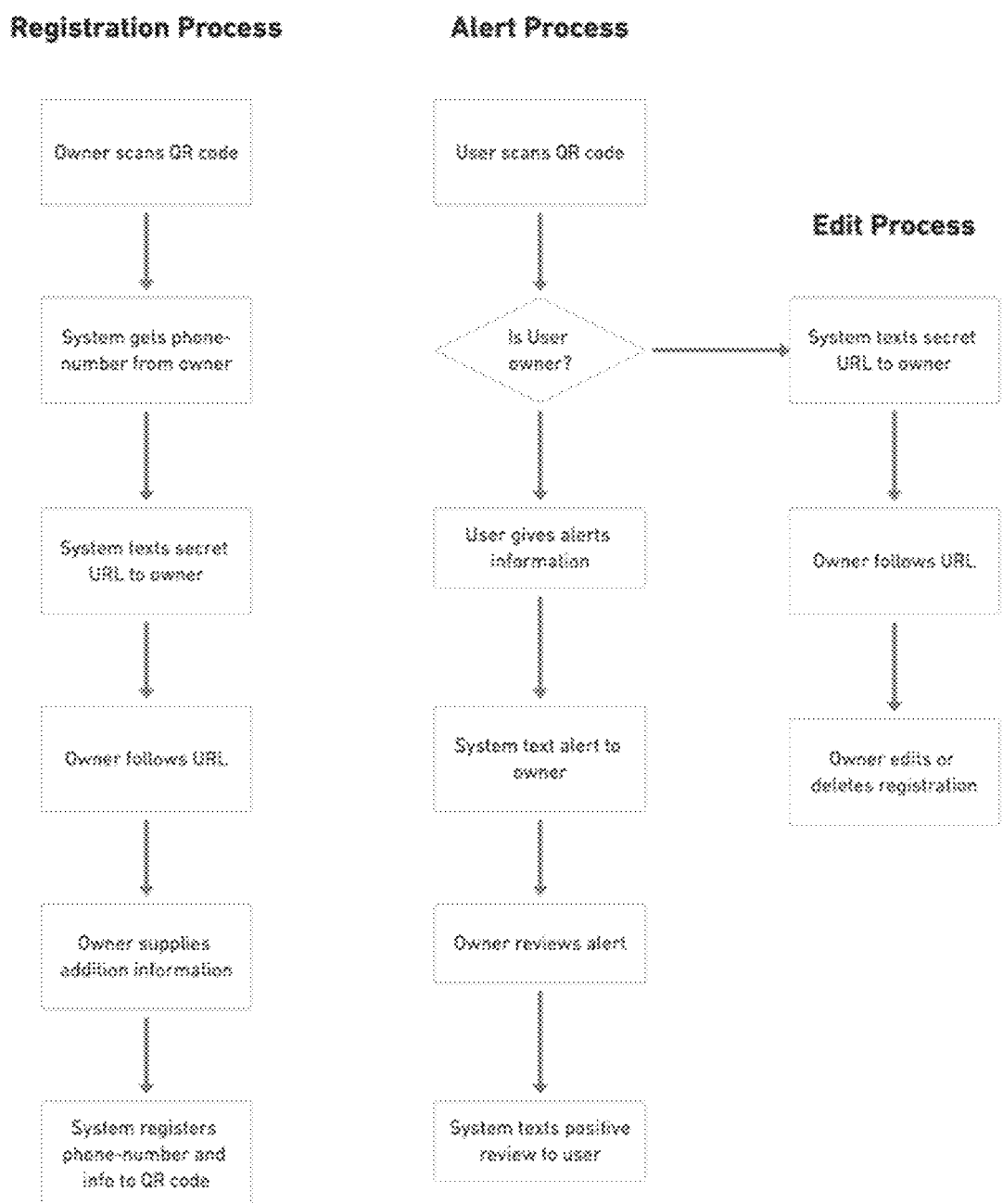
FIG. 1: Flowchart showing the process of QR-code registration and subsequent usage.
Figure 2:
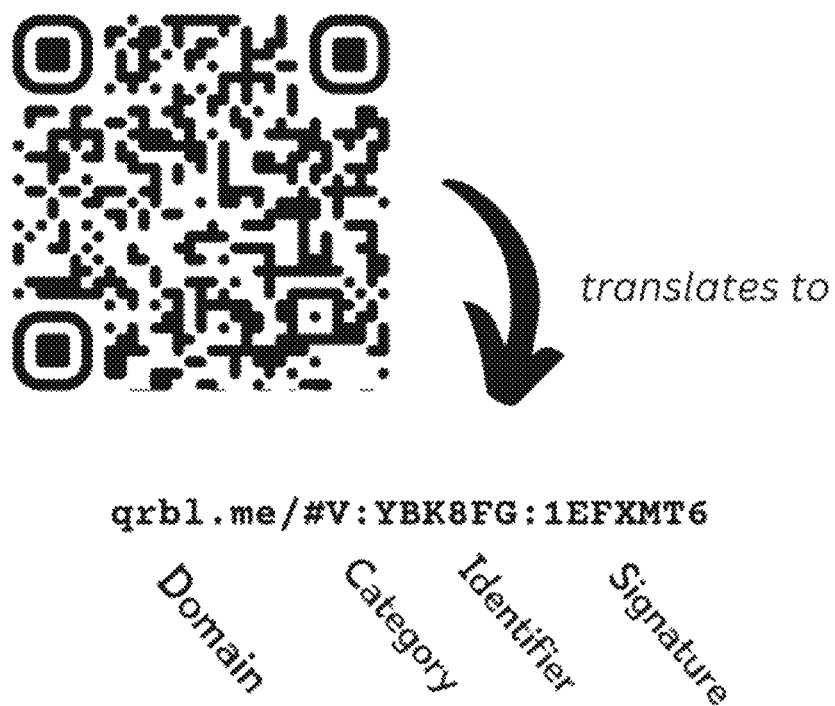
FIG. 2: Diagram illustrating the structure of the QR-code, including the CATEGORY, random identifier, and cryptographic signature.

General representations concerning the disclosure are as follows. All scientific papers, publications, patent documents and other disclosures mentioned herein (including in any appendix filed herewith) are hereby incorporated by reference for all purposes. The embodiments disclosed in this specification are exemplary and do not limit the invention. Other embodiments can be utilized and changes can be made. As used in this specification, the singular forms "a", "an", and "the" include plural reference unless the context clearly dictates otherwise. Thus, for example, a reference to "a part" includes a plurality of such parts, and so forth. The term "comprises" and grammatical equivalents thereof are used in this specification to mean that, in addition to the features specifically identified, other features are optionally present. Where reference is made in this specification to a method comprising two or more defined steps, the defined steps can be carried out in any order or simultaneously (except where the context excludes that possibility), and the method can optionally include one or more other steps which are carried out before any of the defined steps, between two of the defined steps, or after all the defined steps (except where the context excludes that possibility). Where reference is made herein to "first" and "second" features, this is generally done for identification purposes; unless the context requires otherwise, the first and second features can be the same or different, and reference to a first feature does not mean that a second feature is necessarily present (though it may be present). Where reference is made herein to "a" or "an" feature, this includes the possibility that there are two or more such features. This specification incorporates by reference all documents referred to herein and all documents filed concurrently with this specification or filed previously in connection with this application, including but not limited to such documents which are open to public inspection with this specification.

This invention seeks to overcome the limitations of static QR-codes by allowing dynamic registration and utilization of QR-codes, enabling users to assign specific functionalities to QR-codes after the first scan. This flexibility allows for a wide range of applications, including secure messaging for vehicle owners, property alert systems, valuable item tracking, URL redirection, social interaction, and emergency medical information sharing.

This invention encompasses dynamic registrable QR codes and methods of making and using them.

In a general embodiment the invention is a method of making and using a QR code comprising the steps of (1) creating a QR code capable of being displayed and/or printed and/or affixed onto a medium (physical or visual/digital), (2) sending the QR code (physically or electronically) to a user (also called an owner, a first user, a registered user or an original user), (3) explicitly not associating (programming or registering) that QR code with a fixed (unchangeable, immutable) final action, but (4) the first user (owner) registers the QR code with a registration system (e.g., a computerized system accessed by a user via a website and comprising a database or other memory means accessible via a computerized network over the internet) that allows a user (generally the registered user), when they scan the QR code, to assign specific functionalities or information to the QR code that may optionally, in some embodiments, be at least partially accessed by a second/subsequent user/scanner, (5) The owner affixes the QR code or associates the QR code with a person, object or thing, by which (6) a subsequent (second/later, and not first/original/registered) user may scan the QR code with a smart-phone or similar device whereby (7) the user may report real-time data associated with the person, object or thing to the registered owner of the QR code.

Note that steps (4) and (5) need not be done in that order. An owner may receive the QR code and register it, associating the QR code with an action/information, and then associate it with a thing, OR the owner may receive the QR code, associate it with a thing, and then register it, associating the QR code with an action/information.

But importantly the QR code is not registered and associated with an action/information BEFORE it reached the owner. These things are done by the owner.

In a preferred embodiment the invention, showing the key novel aspect of the invention, it can be used as follows:
(1) creating a QR code capable of being displayed and/or printed and/or affixed onto a medium (physical or visual/digital),
(2) explicitly not associating (programming or registering) that QR code with a fixed (unchangeable, immutable) final action, but
(3) affixing the QR code or associating the QR code with an object or thing (4) when the first user scans the QR code, associating the QR code with a registration system (e.g., a computerized system accessed by a user via a website and comprising a database or other memory means accessible via a computerized network over the internet), thereby making that user the owner, and
(5) assigning specific functionalities or information to the QR code that may optionally, in some embodiments, be at least partially accessed by a second/subsequent user/scanner,
(6) a subsequent user (second/later, and not first/original/registered) will then scan the QR code with a smart-phone or similar device whereby this subsequent user may report real-time data associated with the object or thing to the registered owner of the QR code.

The novelty of the invention is that step (3) can be performed before step (5), moving the physical thing from the world of custom manufacturing, to mass manufacturing, which makes it much faster, much cheaper, and much simpler. The QR-code is composed and affixed to a physical object, which is then distributed to its end user, and then is assigned its exact purpose.

In a preferred embodiment, such reporting may be anonymous.

In a preferred embodiment, such reporting may enable a reward of some kind to be sent to the subsequent (second/later) user. Said reward may be in the form of any valuable thing such as money, a voucher exchangeable for services or goods, or recognition, viewable, for example, on social media.

Note that the QR codes described herein may be printed or digital and may be displayed or used in various embodiments in a form that is either printed or transcribed onto a physical medium or visually displayed in a digital form.

Note that in the present invention, a QR-code is generated comprising a domain code and a base code to create (generate) a unique URL. Elements are combined as, for example: https://qrbl.me/#p:5U63W8MJS:OR3ZWRUZY3L, which has the surprising advantage of loading much more quickly than would be expected. It loads quickly because the variable part appears in the anchor (the section after the # in the URL), which supports better caching. This is not an obvious advantage and provides an unexpectedly superior result compared to traditional methods.

Using hash-based routing is faster than more traditional solutions like query parameter routing because, in the first case, the browser only needs to retrieve the instructions from the Content Delivery Network's cache, and the code is processed entirely client-side with JavaScript. On the first-time load, instructions are fetched from the CDN, it benefits from reduced latency as the CDN serves the file from a nearby point-of-presence; this could result in retrieval times as low as 100 ms. The browser then uses JavaScript to interpret the hash without making another request. In contrast, the query parameter requires a full request to the server to process the argument server-side, often taking longer, with round-trip times potentially reaching 800 ms depending on the server's location and load. For subsequent uses, if the instructions are cached in the browser, hash-based routing has near-instant response times (5-20 ms) since no network request is needed; the browser loads the cached file and interprets the hash locally.

In alternative embodiments the same objective may be achieved in a variety of ways, such as:
As a part of a path: https://qrbl.me/lookup/p/5U63W8MJS/OR3ZWRUZY3L As a query parameter: https://qrbl.me/lookup?code=p:5U63W8MJS:OR3ZWRUZY3L Even as part of the domain: https://p-5U63W8MJS-OR3ZWRUZY3L.qrbl.me Note that in most embodiments the QR code may be registered with (associated with) a URL the first time a specific user scans the QR code, or more specifically, scans a QR code that has never successfully completed the registration process.

In some embodiments it is possible to un-register the code and return it to its "virgin" state.

If the code is visible on an item to which it has been affixed or upon which it has been printed, any (unauthorized/inappropriate) individual could ruin the code by scanning it and registering it to their own phone. Thus in certain preferred embodiments, the QR code is not visible or functionally accessible on the object/property/merchandise to which it is affixed. In certain embodiments, the QR code is functionally obscured (i.e. obscured in such a way as a user cannot scan the QU code, which may be fully or partially hidden by some sort of barrier) prior to scanning by the specific user. In some embodiments the functionally obscured QR code is obscured by a removable physical barrier such as a piece of material, plastic, tape or even a scratch-off coating like those used with lotto cards.

This invention provides a system and method for dynamic registration and utilization of QR-code identifiers printed on various physical media, including stickers, plaques, lawn signs, cards, jewelry, and temporary tattoos.

The QR-codes used in this invention specifically consist of three components: a CATEGORY, a random identifier, and a cryptographic signature. The CATEGORY indicates the category of the code, the random identifier distinguishes the code from other QR codes, and the signature ensures the code's authenticity.

Upon the first scan of the QR-code, the user is directed to a website at another location and/or in another system. Upon the first scan of the QR-code, the browser on the user's device is directed to the web-site of the company supporting the QR-code.

A website is considered to be the preferred embodiment as it provides the most elegant and practical solution, however, in other embodiments, the registration process could be conducted by email, IVR, or SMS, telephone or similar systems. In this disclosure we shall only discuss websites, but it is to be understood that the invention encompasses all such alternative embodiments.

At the website, the user can register the code, associating it with a specific purpose or action. Subsequent scans, after the code has been successfully registered, trigger the website to perform the registered action, such as redirecting to a URL, sending a message, or displaying medical information.

In the present disclosure, a URL is considered to be the preferred embodiment, however there are many alternative embodiments, and it is to be understood that the invention encompasses all such alternative embodiments. For example, anything a computer can do could be done at this stage, such as, for example: Remotely operate things like lighting, garage doors, and electric skylights; signing the guest list for a party, signing up for a raffle, prize draw of lottery; joining a mailing list; signing a petition; voting where the QR code is linked to an individual; controlling domestic devices such as HVAC in a group space; controlling and directing the destination e.g. home address) of a driverless taxi or other vehicle; controlling pre-set easting positions in a car; controlling drug administration; opening an Amazon locker; remotely operating things like lighting, garage doors, and electric skylights; logging into a computer; registering entry and exit of a building; playing amplified music (replacing a jukebox); and signing-in and signing-out stations (replacing time-clocks). These and other applications may all be encompassed by the present invention through use of the dynamic QR code.

Because each QR-code is generated without reference to what specific purpose it will eventually be used for, this method is more suitable for mass-manufacturing than the conventional means of deploying QR-codes, where the QR-code is composed to serve a particular pre-selected purpose, and that QR-code has to be applied to the physical item, and the item brought to the end user. This invention simplifies manufacturing, supply-chain, distribution and use of the QR-code. A specific code might mean turn off a light, but at manufacturing time, it does not say which light to turn off.

In certain embodiments the thing associated with the QR code is a vehicle or other equipment operated by an employee of the owner of the equipment, and scanning the code allows members of the public to communicate with the owner of the equipment.

For companies that operate fleets of vehicles, a QR code on a large sign can be mounted on the back of each vehicle with a headline reading "How's my driving?" Members of the public can complain anonymously to company management and the vehicle, date/time, and location will automatically be recorded.

In FIG. 1, the flowchart shows the registration process, the alert process and the edit process.

In the registration process a new "virgin" QR code is scanned by the new owner and the system then requests a communication means from the owner. The owner provides a phone number or email address (or any other means of communication) to the system. The system then texts or emails (or communicates by any other means) the owner to provide the owner with a secret URL. The owner then provides additional information to the system. The system then registers the phone number (or similar) and the provided information with the QR code. The QR code is then affixed to a person, a location, a chattel or other thing (e.g., a car).

In FIG. 1, the flowchart shows the alert process wherein a user (e.g., a passer-by, noticing that a car's meter has expired) uses a phone to scan the QR code. If the user is not the owner, the user may then be directed to a website or other communication platform via which the user provides alert information. The system texts or emails or calls the owner to communicate the alert information. The owner reviews the alert, and the system texts a positive review to the user.

The user may be rewarded in some way such as by the transfer of money to the user or a charity or a voucher or token for a service or goods such as a coffee etc. This could have the additional commercial benefit of involving a coffee chain (e.g., Peet's) as an industry partner etc.

At the stage where the owner scans the QR code and provides the alert, the owner may be taken to a simple web page with a menu allowing the user to select one of a number of pre-filled options such as: meter expiring soon; you have a parking ticket; car illegally parked; car damaged; window broken; car being towed; parking zone change of use imminent etc. In other applications the pre-filled messages could be about the owner's house or garbage can or pet or aged parent etc.

In FIG. 1, the flowchart shows the edit process wherein the person who scans the QR code is the owner, and is texted a secret code allowing the owner to follow a URL to edit or delete information associated with the registered QR code.

In a commercial embodiment generally directed at reporting information associated with parked vehicles, the invention provides a service using a programmable quick response (QR) code affixed to or physically associated with a person, object or thing, for example a vehicle, a home, a chattel, an animal, a piece of land or a person, by which a user may scan the QR code with a smart-phone or similar device to report real-time data associated with person, object or thing to the registered owner of the QR code.

In one embodiment: If the QR-code is generated with the purpose of allowing a user to send a message to the owner of a piece of property, the owner of an animal, the parent of a child, or the guardian of a vulnerable adult, then at registration, the phone-number of the owner, parent, or guardian must be associated with the QR-code.

In another typical embodiment: If the QR-code is generated with the purpose of allowing a user to control some machinery (such as a fan, air-conditioner, or music source in a public place), then at registration, the identifier of that machinery must be associated with the QR-code.

In another typical embodiment: If the QR-code is generated with the purpose of redirecting a user to a particular web-page (such as on a temporary tattoo that redirects to an Instagram page), then at registration, that URL must be associated with the QR-code.

In a further typical embodiment: If the QR-code is generated with the purpose of giving a user medical information about a (possibly stricken or unconscious) person, to be put on a bracelet or permanent tattoo, then at registration, that medical information must be associated with the QR-code.

The invention can be applied to a variety of contexts, including (not exclusively) the following: Vehicle Owner Messaging: QR-codes on vehicle stickers allow passersby to securely message the vehicle owner. The applicants refer to this application as "CurbSamaritan".

Property Alert Systems: QR-codes on property signs enable neighbors to notify the owner of issues or emergencies.

Valuable Item Tracking: QR-codes on items like bicycles and boats allow users to register and track their valuable property.

URL Redirection: QR-codes redirect users to a URL specified by the owner, printed on items like temporary tattoos or garments.

Social Interaction: QR-codes on business cards facilitate social interaction, such as exchanging contact information.

Medical Information Sharing: QR-codes on medical bracelets or pendants display emergency medical information.

Initiation of a payment process for example in conjunction with a parking meter or a bus ticket. A simple example would provide a sign at a bus stop or at the entrance to a bus with a "Scan here to pay" instruction, and paying would unlock a turnstile or give you a receipt you could show to a fare-inspector.

Initiation of a donation, for example, with street performers who today hand-make crude signs with manually generated URLs pointing at Venmo and Zelle accounts.

Use in augmented reality systems to determine the positions of objects in 3-dimensional space.

1. QR-CODE STRUCTURE

The QR-codes used in this invention are generally structured in a standard format. For example, they may be structured as using the following pieces: "category", "identifier" and "signature". The order may vary from one embodiment to another, but a fixed order with a fixed separator character is preferred, such as "CATEGORY:IDENTIFIER:SIGNATURE" which provides a short code that is easy to parse. Another embodiment might be "category=CATEGORY&identifier=IDENTIFIER&signature=SIGNATURE", which would be more in the spirit of HTTP addressing, but longer and much harder to parse.

In a preferred embodiment of the invention, the QR-codes used are generally structured as follows:

CATEGORY:IDENTIFIER:SIGNATURE wherein:

CATEGORY: A 1 to 2 character identifier that categorizes the QR-code.

IDENTIFIER: A 10-character IDENTIFIER string that uniquely identifies the code.

SIGNATURE: An 8-character cryptographic hash of the concatenation of the CATEGORY, IDENTIFIER, and a secret key known only to the company, ensuring that only valid codes can be generated.

In the present embodiments, the number of characters used for various strings is strictly an implementation detail and can be adjusted as necessary without departing from the spirit of the invention. A particular company would be unlikely to have more than a few dozen categories, so CATEGORY typically only needs 1 or 2 characters. IDENTIFIER has to be long enough that every QR-code is in fact unique; in a typical embodiment the applicant uses 10 characters from a 36-character alphabet, so that provides 3,656,158,440,062,976 possible stickers. We use a big number so we can easily generate identifiers at random and rely on probability to guarantee uniqueness.

SIGNATURE has to be long enough to defeat brute-force attacks, so a company less interested in security might use a short one.

Competing systems have used much longer equivalents, but in consequence, their QR-codes have to use very small blocks, making them more difficult to decode at a distance, more vulnerable to damage, and, also; less attractive and less commercially appealing.

To perform the required functions of the invention the code used should have the following characteristics: they should be unique; they should resist forgery; they should be short (so as to produce a simple QR-code that resists damage); and optionally they should be capable of having the code assigned to some purpose.

Note that in the present application the applicant frequently uses the term "category": all codes that the applicant uses in their implemented commercial applications (for QRable LLC) are served by the URL https://qrbl.me, so vehicle codes are prefixed with v:; home codes, with h:, call-my-mom's with m:, and so on. They have demo equivalents like dv:, dh:, and dm:. Other applications for other businesses might have no need for these categorizations and use alternative categorizations relevant to the specific application. The "signature" is not essential, but it is preferred on our commercial embodiments because not using it puts your business in a precarious position, as any competitor could produce counterfeit items, and your business would have to service them as if they were authentic. The "identifier" is absolutely required in all embodiments of the invention.

The number of characters in the CATEGORY, IDENTIFIER and SIGNATURE elements may have varying numbers of characters, and for instance the CATEGORY may have between 1-9 characters, for example 2-7 or 3-5 characters. The IDENTIFIER may have between, for example 1-20 characters e.g., between 1-10, or 2-10, 2-6 or 3-6 characters. The signature may have between 1-20 characters, e.g., between 1-10, or 2-10, 2-6 or 3-5 characters.

The length of the category is solely dictated by business needs. In the present invention, the applicants use one or two characters for CATEGORY, but another implementation might use more characters for easy readability. If the implementation uses serial numbers and decimal digits for identifiers, the first 10 items might have one character identifiers: 0 through 9; the next 90, two characters. In the present invention, the applicants have chosen to use random identifiers, represented in hexatridecimal, base 36, using the digits 0-9 and then A-Z. Right now, we are using 10 hexatridecimal digits for the identifier and for the signature, 8 characters, but the application can increase this if necessary.

The most convenient and effective way the inventors found to provide a QR code with the desired characteristics was in the following format PURPOSE:UUID:SIGNATURE. So, for example v:5U63W8MJS:OR3ZWRUZY3L, where ("v" means "CurbSamaritan for vehicles"). However, in this example, "v" could alternatively have no pre-determined function (all codes are treated identically). Or a serial-number could be used instead of a UUID, or some entirely different technology could be used. In one alternative embodiment, for example, we could just generate totally random codes but only use codes that, when concatenated with a secret key, hash to a number evenly divisible by 1,000. Such alternative embodiments would be compliant and perform the required functions, but would be expensive, and are therefore not considered to be preferred embodiments.

Other embodiments may provide various advantages, for example: (1) Serial numbers, (first 0, then 1, 2, and so on). This is the most compact way to generate identifiers, but imposes a logistical burden, because the "latest number" generated must be centrally recorded. It also cuts into security because valid identifiers are easy to guess and because (if you care) it lets competitors know how many items you have sold. (2) Recorded random numbers; that is, the identifiers are generated at random, but written down as valid. These identifiers are essentially "self-signed": there is no way to test if an identifier has been generated except by trying it against our database and that is computationally no more likely than correctly guessing the signature. The logistical burden is huge, though, as every code generated must be recorded even if it is never used. (3) Random identifiers and signatures, which have a low logistical burden, at an acceptable code length. A scheme that was essentially stand-alone a digital signature, a number that inherently only we could have generated, would be possible, but algorithmically complicated and no more secure than an identifier/signature pair.

The actual mechanism can vary but there are two general goals: Distinguish among QR-codes, so the same website can service different kinds of applications, and guarantee that a QR-code is valid, so website resources cannot be misappropriated. The applicant provides the following example. A provider of QR codes makes codes for several otherwise unrelated businesses, let's call them "CurbSamaritan", "CallMyMom.now", and "Temporary tattoos". Within CurbSamaritan, the provider wants to support several different UIs: one for vehicles, one for houses, etc. The provider also may want to be able to white-label the service to other companies. Finally, the provider wants to do this all with a single website. The "purpose" CATEGORY allows the website to look at a code and say "This is a CurbSamaritan sign on someone's house" or "This is a CallMyMom backpack on a lost little kid" and respond appropriately.

2. REGISTRATION PROCESS

When a user first scans a QR-code, the device/user is directed to the company's website. If the code is not in a database being searched ("the code is virgin"), the user is prompted to register the code. During registration, the user specifies the action or information to be associated with the code. This registration is stored in the database, linking the QR-code to the user and their specified purpose.

For example, in some embodiments, such as an application where a QR code is associated with an object of property or a person or animal, a user may be asked to provide a phone-number to text, and optionally a description of the thing or person or animal being protected.

In another embodiment, such as a petition-signing project, the user would be asked for the ID of the petition to be signed. If it were a remote-control for some machinery, the user would need to identify the particular machine to be controlled.

3. EXAMPLES OF USES AND APPLICATIONS

A. Vehicle Owner Messaging

Owners of vehicles can affix a QR-code sticker to their vehicles. If the vehicle is unattended, passersby can scan the code to securely message the owner. The website filters messages for spam and abuse, ensuring only relevant communications are passed to the owner.

B. Property Alert Systems

QR-codes on lawn signs or property plaques allow neighbors or passersby to notify property owners about issues or emergencies (e.g., Vehicle Owner Messaging). The system provides a secure method for communication without revealing the contact details of either party.

C. Valuable Item Tracking

QR-codes can be affixed to valuable items such as bicycles, boats, or other personal belongings. The owner can register the code to receive notifications or updates if the item is found or moved. Further examples of uses and applications that include Valuable Item Tracking are provided where QR-codes can be affixed to valuable items such as bicycles, boats, or other personal belongings. The owner can register the code to receive notifications or updates if the item is found or moved. A valuable item may be a lost human or pet. The applicant may refer to this application as "findyourmommy".

D. URL Redirection

Users can register a QR-code to redirect scanners to a specific URL. This is useful for promotional purposes, temporary tattoos, or custom apparel and other similar applications. For example, party-goers might tie their social-network URLs to a QR-code on a temporary tattoo and display the tattoo to new acquaintances.

E. Social Interactions

QR-codes on business cards or stationery can facilitate social interactions. Scanning the code might download a VCF card, send a message, or link to a professional profile. Messaging may be anonymous and/or secure messaging. Both anonymous and non-anonymous social interactions may be allowed. QR-codes on business cards or stationery can facilitate social interactions. Scanning the code might download a VCF card, send a message, or link to a professional profile.

F. Medical Information Sharing

QR-codes on medical bracelets, pendants, or tattoos can be registered to display emergency medical information to first responders or medical personnel, or allergies, emergency contact information, durable power of attorney, organ donation information or do not resuscitate requests.

G. Livestock and Pet Information

Pets and livestock often have either implanted microchips or numerical ear-tags, but those are not "self-servicing", i.e., if you found a stray cow with an ear-tag, would you know who to call?i.e., if the average person found a stray cow with an ear-tag, he would not know who to call. When an animal is found, the person would have no understanding of how to translate the number associated with the animal into contact information for its owner. Microchips are inconvenient as they need special scanners to decode, and scanning produces only an ID string; that string can, with some difficulty, be connected to a registry, and then you can phone that registry, and they will contact the owner, assuming the owner has kept the registration up to date, and get back to you in a week or two. Therefore, the present invention may be used to provide information associated with an animal (ownership, identification and health data etc.) by providing a QR code, either on a collar/harness or permanently affixed like an ear-tag, which could be directly and easily scanned by any mobile phone or similar device. The QR code may also inform the user or a reward for finding/returning a lost animal. This provides a huge improvement over traditional implanted tags and would be of great commercial interest to the livestock and pet industry.

H. Jukebox

The methods and devices disclosed herein can be applied to a "jukebox" application similar to the traditional on-table jukebox popular in diners wherein a mini jukebox apparatus is associated with a table (or other location) together with speakers and a display presenting a selection of songs. A QR code may be associated with a table (or other location) and a guest can use the QR code to pay to play a song of their choice via speakers placed at the table (or other location). The QR code can be linked through the internet or through a local WiFi network to a database storing a plurality of songs which can be paid for, selected and played through the local speakers. Such an application could be licensed through ASCAP and the system streams the music to the speakers. An example of an industry partner might be a manufacturer of WiFi speakers such as Sonos. Equally it could be linked to any music streaming service such as Apple or Spotify or to a video streaming service. A video application would require a viewing device such as a screen. This application would equally work for music videos, film video shorts and any other type of audio and/or visual medium.

I. Municipal Services Reporting

Municipalities (cities counties etc.) can use the methods and devices disclosed herein in a similar way to the 311 service in major American cities like New York, Austin, Baltimore, and San Francisco which provides information, resources, and services to residents, visitors, and businesses, allows users to track and explore past reports, view case notes, and explore requests in their neighborhood. It can be integrated with 311 services, or 311-alternatives like SeeClickFix.com.

In this embodiment a QR sticker could be provided with an information label, for example "Does something need cleaning on this block?" The app could let the user take a photo and send the information into the queue to be addressed. The location would be pre-programmed into the QR code once it is placed in a specific location. Such an application would likewise work for facility management in large complexes (e.g., "Does this elevator have a problem?" or "Is this bathroom facility clean?" or "Does this fire-extinguisher need maintenance?". This system would provide a highly user-friendly, quick and convenient system for reporting action-items, and importantly can provide a local network for local issues.

4. SECURITY AND PRIVACY

The system is designed with security and privacy in mind. The cryptographic signature ensures that only QR-codes generated by the company are valid. The website provides secure messaging and information sharing, with mechanisms to prevent spam, abuse, and unauthorized access. In one example, in various embodiments every message is passed through a LLM that (i) discards any message without useful content, (ii) rephrases any message that is abusive, obscene, or just in a foreign language into polite English, and (iii) detects any emergency conditions and notifies the a company/individual operations team or operating the service who can in turn notify emergency services.

5. COMMERCIAL APPLICATIONS

The invention is commercially viable in various industries, including automotive, real estate, personal safety, marketing, and healthcare. The QR-codes can be sold or distributed to consumers, offering a customizable and secure way to manage information and interactions.

6. EXAMPLES OF EMBODIMENTS

Examples of embodiments include the following:

A method for dynamically registering and utilizing QR-codes, the method comprising:
  (i) generating a QR-code comprising a domain code and a base code to generate a unique URL;
  (ii) printing or affixing (in any pay such as using glue or a tag or engraving, embroidering, etching, inscribing, emblazoning etc.) the QR-code onto a physical medium;
  (iii) providing a specific user (usually an individual human user but may be a robotic user or an electronic or mechanical system or a system including a computer) and a smart-phone (or other similar device) comprising an optical hand-held scanning device of any appropriate kind for scanning the QR code;
  (iv) using said smart-phone to scan the QR-code for the first time by the specific user (or at least for the first time the QR code has been registered by the user), whereby the user is directed to a registration website by the scanning device or by a second device in communication with said scanning device;
  (v) allowing the user to register (or re-register) the QR-code with a specific action;
  (vi) storing the registration information in an information storage means (may be a database of any kind, flash RAM etc.).
  (vii) Performing the registered action upon subsequent scans of the QR-code by other (by any) users.

Another embodiment encompasses the method above wherein the CATEGORY of the base code categorizes the QR-code into different application types.

In other embodiments the application and category types could be defined by different elements of the QR code such as the full URL, for example it ["category" also] could be defined in the domain, but would be an inferior solution because the whole domain has to be resolved through the Domain Naming System (DNS), which necessarily slows the loading of the page. Also, alternatively, it could be put in the path, which would avoid the extra DNS lookups, but would prevent the page from being cached either on the device (e.g., phone) or in the Content Distribution System (CDN) again slowing down loading. So, in one example, in our preferred implementation we put it in the "anchor", the part after the pound symbol, e.g.: https://qrbl.me/#p:5U63W8MJS:OR3ZWRUZY3L. The anchor is not transmitted over the Internet at all, so page loading is much faster. Thus the whole system is optimized: every project, every variation, even every white-labeled product, just retrieves a simple domain (e.g., https://qrbl.me) which is served from a CDN very close to the user, and the page does its first contentful render in a few tenths of a second.

APPENDIX AND DEFINITIONS

'Domain' refers to a network domain such as "google.com" and "qrable.me".

'Base code' means an instance of the unique, unforgeable code described above. An example would be p:5U63W8MJS:OR3ZWRUZY3L.

A "hash of a base code" generally refers to a unique, fixed-length string generated by applying a hashing algorithm to a piece of source code (the "base code"), essentially creating a fingerprint that represents the code's content, allowing for quick comparison and verification of whether the code has been altered or not. The hashing algorithm takes the base code as input and produces a shorter, fixed-length string (the hash) that acts as a unique identifier for that specific code. For security purposes, especially when dealing with sensitive code, a cryptographic hash function is usually used to ensure that even slight changes in the base code result in a significantly different hash value.

'QR-code' is a quick response code as defined in the specification and elsewhere representing the entire URL.

'UPC' means Universal Product Code.

'UI' means "user interface".

'UUID' means "Universally unique identifier", and refers to an identifier that is generated wholly at random and relies on the length of the identifier (and the laws of probability) to guarantee global uniqueness.

'SIGNATURE' means a string that cryptographically verifies the authenticity of another string, in this case the CATEGORY and IDENTIFIER, by means of a secret and a one-way computation.

'CATEGORY' means a particular purpose to which a base-code might apply.

IDENTIFIER is a string that distinguishes a particular base-code (and any registration information associated with it) from other base-codes from the same company.

'URL' means Universal Resource Location, in our case one that conveys the base code and the address of the server that can register and resolve that code.

'Static' means unchanging over time.

'Database' means a collection of data, in this case the collection of the registration information associated with all the registered base-codes.

An 'Information storage means' refers to any means for electronically storing information including on a database, magnetic media, optical media, static RAM chips etc.

'Dynamic/dynamically' refers to the ability to change the action or information with which the QR code is associated after the QR-code has been created and affixed to a physical object.

'Registering' refers to associating a specific code with its actual purpose. For a CurbSamaritan QR-code, that would be, attaching the phone number of the driver of a particular car, and the description of the car.

'Action' (as in the context of registering a QR code with an action) refers to something that is done or is caused to be done such as the running of a computer program or displaying information.

'Scanner' refers to a device capable of understanding a QR code and following the encoded URL.

'LLM' means large-language model, a very powerful artificial-intelligence mechanism, which this invention uses to filter out unhelpful messages.

To "white-label" something means to provide the technical means to another company, which will use its own branding and its own marketing resources to offer the product to customers.

'Functionally obscured' means that the QR code cannot be seen sufficiently to allow scanning.

'Secure communication' refers to sending of messages or data of any kind in a way not accessible without a code or key.

"Print/printing" is used to refer equally to affixing and includes engraving, embroidering, etching, inscribing, emblazoning.

Spam refers to any unwanted or unsolicited communication.

"Electronic scanning device/optical scanning device" refers to any device that can be used to scan a QR code, such as a smart-phone.

"Registering" means associating a specific code with its actual purpose. For a CurbSamaritan QR-code, that would be, attaching the phone number of the driver of a particular car, and the description of the car.

"A specific registered action" as in the phrase "enabling the user to register the QR-code with a specific registered action" refers to any action to be carried out by an automated computerized system including directing a device to a URL or performing an action such as opening a door, delivering a drug, activating a siren, paying a song, ordering a taxi, making a phone call, sending a text, sending an email, activating a machine, deactivating a machine, turning something on or off such as lights, heating, etc. or any other desired action.

The phrase "person, animal or thing" encompasses literally anything appropriate for the application of the invention and includes, but is not limited to chattels, vehicles, buildings, people, animals, pets, money, currency, legal papers, locations, such as locations within buildings or outside, objects and machines, parts of machines, inventory, stock, foods, fuel containers, images including electronic images, children and children's clothes, a person with dementia, a criminal, a wild animal, laboratory samples, fire extinguishers computers, tools, phones etc. There is no limit to the things the QR code may be associated with and the phrase "associated with" or "applied to" does not require the physical application of the QR code in as much as it may be displayed or represented on a screen or a web page.

The phrase "enabling the user to register the QR-code with a specific registered action associated with the person, animal or thing" means that the registered action may be associated in any way whatsoever with the person, animal or thing such that the action may be done to or done by or may affect or inform or be informationally associated with (have or display or record information) the person, animal or thing, with or without the knowledge or participation of the person, animal or thing.

The phrase "attaching, applying or associating the QR-code to a person, thing etc." encompasses all manner of attachments and associations. For example a QR code could be printed onto an adhesive label and attached to an object, such as to the windshield of a car. It could be printed onto a label which is stuck on a tag which is then attached to the ear of a sheep. It could be incorporated into a temporary tattoo and then stuck to the skin of a person going to a concert. It could be sent to a phone by text or email or other electronic message system and optionally downloaded and then displayed on the phone, whereby the QR code is then "associated with" the user of that phone.

The invention claimed is:

1. A method for dynamically registering and utilizing QR-codes, the method comprising:
   (i) generating a QR-code representing a unique URL, which is comprised of a domain, and a base-code;
   (ii) attaching, applying or associating the QR-code to a person, animal or thing, or onto a physical medium adapted to be applied to or associated with a person, animal or thing;
   (iii) providing a specific user;
   (iv) providing a smart-phone for use by said user, comprising an optical hand-held scanning device for scanning the QR code;

(v) using said smart-phone to scan the QR-code for the first time for the specific user, whereby the user is directed to a registration website by the scanning device or by a second device in communication with said scanning device;

(vi) enabling the user to register the QR-code with a specific registered action associated with the person, animal or thing;

(vii) storing the registration information in an information storage means;

(viii) performing the registered action upon subsequent scans of the QR-code by other users, and (ix) allowing said specific user who originally registered the code to update aspects of the registration.

2. The method of claim 1, wherein specific registered action comprises retrieval and/or display of information associated with the person, animal or thing or with an owner of said person, animal or thing.

3. The method of claim 1, wherein the base code comprises a first element and a second element, and wherein one of said elements of the base code categorizes the QR-code into different application types and one of said elements of the base code represents a cryptographic signature.

4. The method of claim 3 wherein said first element is the CATEGORY of the base code.

5. The method of claim 3, wherein a second element of the base code is the cryptographic signature.

6. The method of claim 1, wherein the physical medium is selected from the group including stickers, tags, plaques, lawn signs, cards, jewelry, and temporary tattoos which can then be applied to or associated with a person, animal or thing.

7. The method of claim 1 wherein the QR code printed onto the physical medium is functionally obscured prior to scanning by the specific user.

8. The method of claim 7 whereby the functionally obscured QR code is obscured by a removable physical barrier, for security during distribution and retail sales.

9. The method of claim 1, further comprising a secure messaging system that allows secure communication between the specific user and other individuals.

10. The method of claim 1, wherein the specific registered action further comprises a system for filtering spam and abusive messages using an AI technology to examine each message.

11. The method of claim 1, wherein the QR-code points to a URL specified by the user during registration.

12. The method of claim 1, wherein scanning the QR-code points to a URL that displays emergency medical information registered by the user.

13. The method of claim 1, wherein scanning the QR-code facilitates social interaction by allowing the exchange of contact information or other social actions.

14. The method of claim 13, wherein the social interactions are anonymous apart from the contact information or other social actions intentionally sent.

15. The method of claim 1, wherein the person, animal or thing is a physical property owned by a person or entity, and scanning the QR-code allows the user to communicate anonymously with the owner of the property associated with the QR-code by sending a secure message to the owner.

16. The method of claim 15, wherein the recipient of said message about said property can reward the sender either directly or by donating to a charitable organization selected by the sender.

17. The method of claim 1, wherein the person, animal or thing is selected from the group consisting of a vehicle, a physical chattel, a building, an object, a specific location, an individual, an animal, a screen and a web page.

18. The method of claim 1, wherein the user can be authorized to edit or delete information associated with the QR-code by scanning the QR-code and requesting a one-time code be sent to the phone-number associated with the QR-code.

19. The method of claim 1, wherein the thing is a vehicle or other equipment operated by an employee of the owner of the equipment, and scanning the code allows members of the public to communicate with the owner of the equipment.

20. A method for dynamically registering and utilizing QR-codes, the method comprising:

(i) generating a QR-code representing a unique URL, which is comprised of a domain, and a base-code;

(ii) attaching, applying or associating the QR-code to a person, animal or thing, or onto a physical medium adapted to be applied to or associated with a person, animal or thing;

(iii) providing a specific user;

(iv) providing a smart-phone for use by said user, comprising an optical hand-held scanning device for scanning the QR code;

(v) using said smart-phone to scan the QR-code for the first time for the specific user, whereby the user is directed to a registration website by the scanning device or by a second device in communication with said scanning device;

(vi) enabling the user to register the QR-code with a specific registered action associated with the person, animal or thing;

(vii) storing the registration information in an information storage means;

(viii) performing the registered action upon subsequent scans of the QR-code by other users, and (ix) allowing said specific user who originally registered the code to update aspects of the registration;

wherein the base code comprises a first element and a second element, and wherein one of said elements of the base code categorizes the QR-code into different application types and one of said elements of the base code represents a cryptographic signature; and further, wherein a third element of the base code is the signature and is generated using a hash of the rest of the base code concatenated with a secret key.

* * * * *